United States Patent
Brew et al.

(10) Patent No.: US 11,312,662 B2
(45) Date of Patent: Apr. 26, 2022

(54) HIGH ISOSTATIC STRENGTH HONEYCOMB STRUCTURES AND EXTRUSION DIES THEREFOR

(71) Applicant: CORNING INCORPORATED, Corning, NY (US)

(72) Inventors: Thomas William Brew, Corning, NY (US); Priyank Paras Jain, Horseheads, NY (US); Konstantin Vladimirovich Khodosevich, Saint Petersburg (RU); John M Larson, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/052,682

(22) PCT Filed: May 3, 2019

(86) PCT No.: PCT/US2019/030663
§ 371 (c)(1),
(2) Date: Nov. 3, 2020

(87) PCT Pub. No.: WO2019/213569
PCT Pub. Date: Nov. 7, 2019

(65) Prior Publication Data
US 2021/0238104 A1 Aug. 5, 2021

Related U.S. Application Data

(60) Provisional application No. 62/667,365, filed on May 4, 2018.

(51) Int. Cl.
C04B 38/00 (2006.01)
B01D 46/24 (2006.01)
(Continued)

(52) U.S. Cl.
CPC ........ *C04B 38/0009* (2013.01); *B01D 46/247* (2013.01); *B01D 46/2474* (2013.01);
(Continued)

(58) Field of Classification Search
None
See application file for complete search history.

(56) References Cited

U.S. PATENT DOCUMENTS 3,885,977 A 5/1975 Lachman et al.
4,276,071 A 6/1981 Outland
(Continued)

FOREIGN PATENT DOCUMENTS

EP 2130574 A1 12/2009
JP 2003-269131 A 9/2003
(Continued)

OTHER PUBLICATIONS

International Search Report and Written Opinion of the International Searching Authority; PCT/US2019/030663; dated Jun. 26, 2019; 12 Pages; European Patent Office.

*Primary Examiner* — David Sample
*Assistant Examiner* — Elizabeth Collister
(74) *Attorney, Agent, or Firm* — Joseph M. Homa

(57) ABSTRACT

A honeycomb structure (110) includes intersecting porous walls (106). Inlet channels (108*i*) and outlet channels (108*o*) are formed by the intersecting porous walls (106), wherein the inlet channels (108*i*) comprise inlet hydraulic diameters (HDi) and the outlet channels (108*o*) comprise outlet hydraulic diameters (HDo). The inlet channels (108*i*) comprise inlet corners (220*i*) with inlet corner radii (Ri) and the outlet channels (108*o*) comprise outlet corners (220O) with outlet corner radii (Ro). A centerpost (124) is defined by adjacent opposing inlet corners (220*i*) of two of the inlet channels (108*i*) and adjacent opposing outlet corners (220O)

(Continued)

of two of the outlet channels (108o). A first diagonal length (D1) is a shortest distance between the opposing outlet corners (220o) of the two outlet channels (108o) and a second diagonal length (D2) is a shortest distance between the opposing inlet corners (220i) of the two inlet channels (108i). The honeycomb structure (110) has certain aspect ratios D1:D2 depending on hydraulic diameter ratios HDi: HDo.

21 Claims, 5 Drawing Sheets

(51) Int. Cl.
  *B01J 35/00* (2006.01)
  *B01J 35/04* (2006.01)
  *B28B 3/26* (2006.01)
  *B28B 3/20* (2006.01)
  *F01N 3/022* (2006.01)
  *F01N 3/28* (2006.01)

(52) U.S. Cl.
  CPC .......... *B01J 35/0026* (2013.01); *B01J 35/04* (2013.01); *B28B 3/269* (2013.01); *B01D 46/249* (2021.08); *B01D 46/2498* (2021.08); *B01D 2279/30* (2013.01); *B28B 2003/203* (2013.01); *F01N 3/0222* (2013.01); *F01N 3/2825* (2013.01); *F01N 2330/06* (2013.01); *F01N 2330/30* (2013.01)

(56) References Cited

U.S. PATENT DOCUMENTS

| | | | |
|---|---|---|---|
| 4,298,328 A | 11/1981 | Frost | |
| 4,349,329 A | 9/1982 | Naito et al. | |
| 5,332,703 A | 7/1994 | Hickman | |
| 6,221,308 B1 | 4/2001 | Peng | |
| 6,259,078 B1 | 7/2001 | Araya | |
| 6,391,813 B1 | 5/2002 | Merkel | |
| 6,541,407 B2 | 4/2003 | Beall et al. | |
| 6,696,132 B2 | 2/2004 | Beall et al. | |
| 6,843,822 B2 | 1/2005 | Beall et al. | |
| 7,017,278 B2 | 3/2006 | Kato | |
| 7,247,184 B2 | 7/2007 | Frost | |
| 7,596,885 B2 | 10/2009 | Adrian et al. | |
| 7,601,194 B2 | 10/2009 | Beall et al. | |
| 8,246,710 B2 | 8/2012 | Komori et al. | |
| 8,974,724 B2 | 3/2015 | Day et al. | |
| 9,005,517 B2 | 4/2015 | Bronfenbrenner et al. | |
| 9,038,284 B2 | 5/2015 | Feldman et al. | |
| 9,335,093 B2 | 5/2016 | Feldman et al. | |
| 9,358,487 B2 | 6/2016 | Toyoshima et al. | |
| 9,446,560 B2 | 9/2016 | Bronfenbrenner et al. | |
| 9,452,578 B2 | 9/2016 | Bronfenbrenner et al. | |
| 9,623,359 B2 | 4/2017 | Toyoshima et al. | |
| 9,808,794 B2 | 11/2017 | Brew et al. | |
| 10,056,142 B2 | 8/2018 | Ge et al. | |
| 2005/0066639 A1* | 3/2005 | Frost | C04B 38/0009 55/523 |
| 2005/0166562 A1 | 8/2005 | Beall et al. | |
| 2009/0139193 A1 | 6/2009 | Garcia et al. | |
| 2011/0020185 A1 | 1/2011 | Vincent et al. | |
| 2011/0132194 A1* | 6/2011 | Ahmed | B01D 46/2455 95/273 |
| 2011/0206896 A1* | 8/2011 | Humphrey | B28B 3/269 428/117 |
| 2012/0247088 A1* | 10/2012 | Beall | F01N 3/0821 60/274 |
| 2013/0055694 A1 | 3/2013 | Salmona et al. | |
| 2014/0127453 A1 | 5/2014 | Toyoshima et al. | |
| 2014/0208946 A1* | 7/2014 | He | B01D 46/2459 95/273 |
| 2014/0238242 A1* | 8/2014 | He | F01N 3/0222 95/278 |
| 2015/0152768 A1* | 6/2015 | Arulraj | B01J 37/0246 428/117 |

FOREIGN PATENT DOCUMENTS

| | | |
|---|---|---|
| JP | 2005-270969 A | 10/2005 |
| WO | 2008/066765 A1 | 6/2008 |
| WO | 2014/046912 A1 | 3/2014 |

* cited by examiner

"Enlarged View"

HIGH ISOSTATIC STRENGTH HONEYCOMB STRUCTURES AND EXTRUSION DIES THEREFOR

RELATED APPLICATION

This is a national stage application under 35 U.S.C. § 371 of International Application No. PCT/US2019/030663, filed May 3, 2019, which claims priority from U.S. Provisional Patent Application No. 62/667,365, filed May 4, 2018, and entitled "High Isostatic Strength Honeycomb Structures And Extrusion Dies Therefor", which is hereby incorporated herein by reference in its entirety for all purposes.

FIELD

Embodiments of the disclosure relate to honeycomb bodies and honeycomb structures, and more particularly to ceramic honeycomb bodies having high isostatic (ISO) strength.

BACKGROUND

Ceramic honeycomb body designs with relatively thin wall thicknesses can be utilized in exhaust after-treatment systems.

SUMMARY

Embodiments of the disclosure provide honeycomb structures and honeycomb bodies.

In other embodiments, the disclosure also provides methods of manufacturing honeycomb structures and honeycomb bodies.

In further embodiments, the disclosure also provides extrusion dies suitable for manufacturing the honeycomb structures and honeycomb bodies described herein.

Embodiments of the disclosure further provide honeycomb structures and honeycomb bodies that have increased ISO strength and that comprise asymmetric cell channels, that is, some cell channels comprising relatively larger hydraulic diameters and other cell channels comprising relatively smaller hydraulic diameters.

Some embodiments of the disclosure provide a honeycomb structure comprising inlet channels and outlet channels. The honeycomb structure comprises intersecting porous walls extending between an inlet end and an outlet end of the honeycomb structure, inlet channels and outlet channels formed by the intersecting porous walls, the inlet channels comprising inlet hydraulic diameters HDi and the outlet channels comprising outlet hydraulic diameters HDo. The inlet channels comprise inlet corners with inlet corner radii Ri, and the outlet channels comprising outlet corners with outlet corner radii Ro. A centerpost is defined by adjacent opposing inlet corners of two of the inlet channels and adjacent opposing outlet corners of two of the outlet channels, wherein the centerpost comprises: a first diagonal length D1 being a shortest distance between the adjacent opposing outlet corners of the two outlet channels, and a second diagonal length D2 being a shortest distance between the adjacent opposing inlet corners of two of the inlet channels. The honeycomb structure further comprises:

an aspect ratio D1:D2 being less than 2.7 when a hydraulic diameter ratio HDi:HDo is in a range from 1.4 to 1.6, and the aspect ratio D1:D2 being less than 2.0 and the outlet corner radii Ro being less than 7 mils when the hydraulic diameter ratio HDi:HDo is in a range from 1.2 to less than 1.4.

Another embodiment of the disclosure provides a honeycomb structure comprising channel density in a range from 250 cpsi to less than 350 cpsi. The honeycomb structure comprises intersecting porous walls extending between an inlet end and an outlet end of the honeycomb structure, inlet channels and outlet channels formed by the intersecting porous walls, inlet hydraulic diameters of the inlet channels being greater than outlet hydraulic diameters of the outlet channels, and the inlet channels comprising inlet corners with inlet corner radii Ri in a range from 10 mils (0.25 mm) to 14 mils (0.36 mm), and the outlet channels comprising outlet corners with outlet corner radii Ro in a range from 5 mils (0.13 mm) to 7 mils (0.18 mm), a centerpost defined by adjacent opposing inlet corners of two of the inlet channels and adjacent opposing outlet corners of two of the outlet channels, a first diagonal length D1 of the centerpost being a shortest distance between the opposing outlet corners of the two outlet channels, D1 being in a range from 25 mils (0.64 mm) to 31 mils (0.79 mm), a second diagonal length D2 being a shortest distance between the opposing inlet corners of the two inlet channels, D2 being in a range from 12 mils (0.30 mm) to 18 mils (0.46 mm), and an aspect ratio of D1:D2 of the centerpost in a range from 1.6 to 2.0; and a channel density in a range from 250 cpsi to less than 350 cpsi.

Another embodiment of the disclosure provides a honeycomb structure comprising channel density in a range from 350 cpsi to 450 cpsi. The honeycomb structure comprises intersecting porous walls extending between an inlet end and an outlet end of the honeycomb structure, inlet channels and outlet channels formed by the intersecting porous walls, inlet hydraulic diameters of the inlet channels being greater than outlet hydraulic diameters of the outlet channels, and the inlet channels comprising inlet corners with inlet corner radii Ri in a range from 16 mils (0.41 mm) to 20 mils (0.51 mm) and the outlet channels comprising outlet corners with outlet corner radii Ro in a range from 4 mils (0.10 mm) to 7 mils (0.18 mm), a centerpost defined by adjacent opposing inlet corners of two of the inlet channels and adjacent opposing outlet corners of two of the outlet channels, a first diagonal length D1 being a shortest distance between the opposing outlet corners of two of the outlet channels, D1 being in a range from 26 mils (0.66 mm) to 32 mils (0.81 mm), a second diagonal length D2 being a shortest distance between the opposing inlet corners of two of the inlet channels, D2 being in a range from 10 mils (0.25 mm) to 16 mils (0.41 mm), and an aspect ratio D1:D2 of the centerpost in a range from 1.9 to 2.5; and a channel density in a range from 350 cpsi to 450 cpsi.

In other embodiments, a honeycomb extrusion die is provided. The honeycomb extrusion die comprises an arrangement of die pins forming intersecting slots, the die pins comprising inlet pins and outlet pins, a cross-sectional area of the inlet pins being greater than a cross-sectional area of the outlet pins, and the inlet pins comprising inlet corner radii Ri in a range from 10 mils (0.25 mm) to 14 mils (0.36 mm), and the outlet pins comprising outlet corner radii Ro in a range from 5 mils (0.13 mm) to 7 mils (0.18 mm), a centerpost slot located between opposing inlet corners of two of the inlet pins and between opposing outlet corners of two of the outlet pins, a first diagonal slot length DS1 being a shortest distance between the opposing outlet corners of the two of the outlet pins, DS1 being in a range from 26 mils (0.66 mm) to 32 mils (0.81 mm), a second diagonal slot length DS2 being a shortest distance between the opposing inlet corners of the two of the inlet pins, DS2 being in a range from 12 mils (0.30 mm) to 18 mils (0.46 mm), and a, aspect ratio of DS1:DS2 is in a range from 1.6 to 2.0; and a die pin density in a range from 250 die pins per square inch (dppsi) to less than 350 dppsi.

Another embodiment of a honeycomb extrusion die comprises an arrangement of die pins forming intersecting slots, the die pins comprising inlet pins and outlet pins, a cross-sectional area of the inlet pins being greater than a cross-sectional area of the outlet pins, and the outlet pins comprising outlet corner radii Ro in a range from 4 mils (0.10 mm) to 7 mils (0.18 mm), and the inlet pins comprising inlet corner radii Ro in a range from 16 mils (0.41 mm) to 20 mils (0.51 mm), a centerpost slot located between opposing inlet corners of two of the inlet pins and between opposing outlet corners of two of the outlet pins, a first diagonal slot length DS1 being a shortest distance between the opposing outlet corners of the two of the outlet pins, DS1 being in a range from 26 mils (0.66 mm) to 32 mils (0.81 mm), a second diagonal slot length DS2 being a shortest distance between the opposing inlet corners of the two of the inlet pins, DS2 being in a range from 10 mils (0.25 mm) to 16 mils (0.41 mm), an aspect ratio of DS1:DS2 is in a range from 1.9 to 2.5, and a die pin density in a range from 350 dppsi to 450 dppsi.

Another embodiment of the disclosure provides a honeycomb body comprising a honeycomb structure. The honeycomb structure comprising intersecting porous walls extending between an inlet end and an outlet end of the honeycomb structure; inlet channels and outlet channels formed by the intersecting porous walls, the inlet channels comprising inlet hydraulic diameters HDi and the outlet channels comprising outlet hydraulic diameters HDo, the inlet channels comprising inlet corners with inlet corner radii Ri, and the outlet channels comprising outlet corners with outlet corner radii Ro; a centerpost defined by adjacent opposing inlet corners of two of the inlet channels and adjacent opposing outlet corners of two of the outlet channels; wherein the centerpost comprises: a first diagonal length D1 being a shortest distance between the adjacent opposing outlet corners; a second diagonal length D2 being a shortest distance between the adjacent opposing inlet corners; an aspect ratio D1:D2 being less than 2.7 when a hydraulic diameter ratio HDi:HDo is in a range from 1.4 to 1.6, and a channel density is in a range from 350 cpsi to 450 cpsi; and the aspect ratio D1:D2 being less than 2.0 and the outlet corner radii Ro being less than 7 mils when the hydraulic diameter ratio HDi:HDo is in a range from 1.2 to less than 1.4, and a channel density is in a range from 250 cpsi to less than 350 cpsi.

Additional features of the disclosure will be set forth in the description which follows, and in part will be apparent from the description, or may be learned by practice of the disclosure.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the disclosure. Like reference numerals used in the drawings identify similar or identical elements throughout the several views. The drawings are not necessarily drawn to scale.

DETAILED DESCRIPTION

Figure 1A:
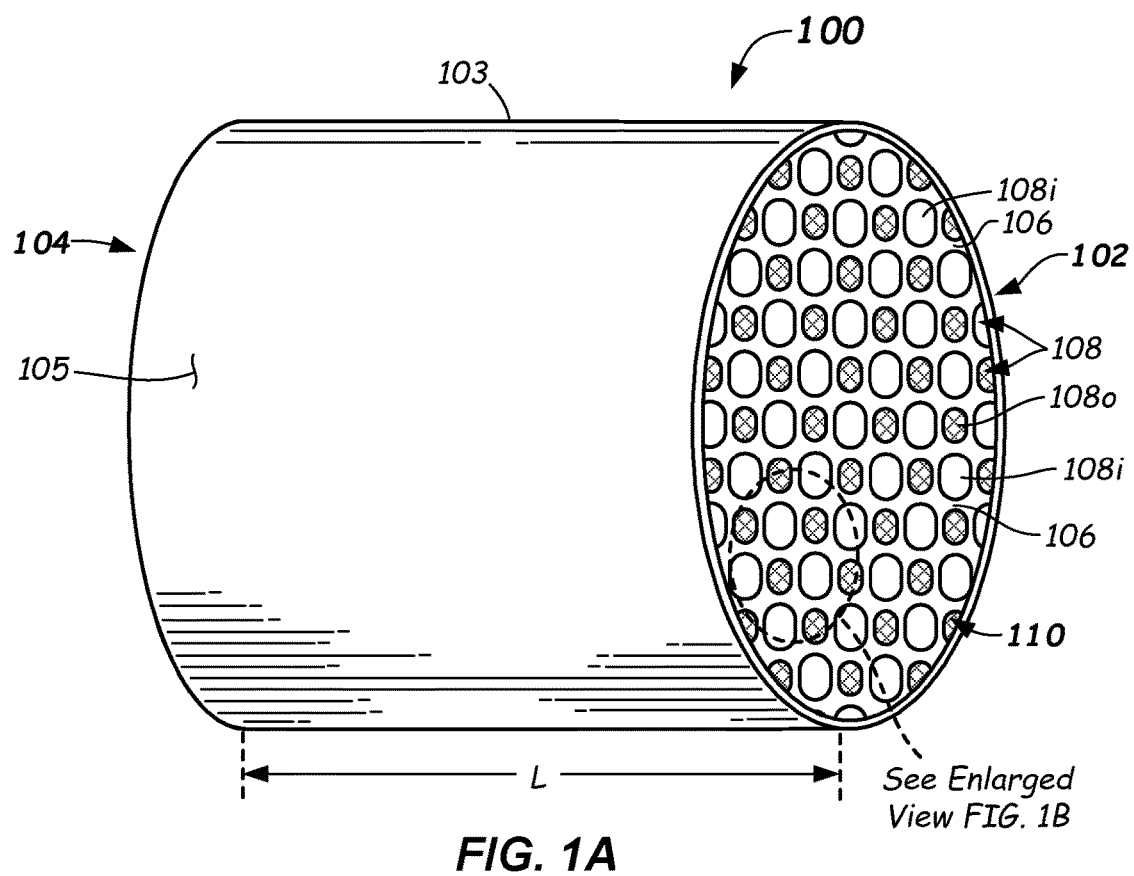
FIG. 1A schematically illustrates a perspective view of a honeycomb body comprising a honeycomb structure according to embodiments disclosed herein.

Reference will now be made in detail to embodiments of honeycomb structures and honeycomb bodies, such as plugged porous ceramic honeycomb bodies and honeycomb structures thereof, embodiments of which are illustrated in the accompanying drawings. Whenever possible, the same reference numerals will be used throughout the drawings to refer to the same or like parts.

After-treatment of exhaust gas from internal combustion engines may use a catalyzed or uncatalyzed filter for the removal of soot particles. Filters in these applications may include honeycomb bodies that may be refractory, thermal shock resistant, stable under a range of $pO_2$ conditions, non-reactive with the catalyst system (if present), and offer low resistance to exhaust gas flow. Porous ceramic honeycomb bodies comprising a wall-flow honeycomb structure, referred to herein as a "plugged honeycomb body," may be used in these applications. The honeycomb bodies may comprise honeycomb structures, that is, structures having intersecting porous walls forming channels, as described herein.

The honeycomb bodies can be formed by an extrusion process where a ceramic batch mixture is extruded from an extrusion die into a green form, dried, and fired to form a final ceramic honeycomb body comprising the honeycomb structure. The extrusion can be performed using a hydraulic ram extrusion press, a two stage de-airing single auger extruder, or a twin-screw extruder with a die of a die assembly attached to a discharge end, as described in detail below. Other suitable devices may be used to form the honeycomb structures and bodies described herein. As described below, the firing and/or other processes taking place may cause traditional honeycomb bodies to crack. Thus, any process or structural improvement that enables higher ISO strength and reduced cracking would be considered to be a substantial advancement, as cracking can be a substantial detractor from low-cost manufacturing.

The ceramic-forming batch mixture used to form the structure and body may be, for example, a ceramic-forming mixture, comprising a ceramic-forming batch material that may comprise inorganic particles or ceramic particles, or both, and optional one or more pore formers, a rheology modifier, a liquid vehicle, and the like, and combinations thereof. When fired, the batch mixture is transformed or sintered into a porous ceramic material comprising a porous ceramic structure that is, for example, suitable for exhaust treatment purposes. The ceramic that is formed may be cordierite, aluminum titanate, silicon carbide, silicon nitride, alumina, mullite, and the like, and combinations thereof. The ceramic-forming batch mixture and the final ceramic material formed may comprise other suitable materials.

Honeycomb extrusion dies employed to produce such honeycomb structures and honeycomb bodies can be multi-component assemblies comprising, for example, a wall-forming die body that may comprise a skin-forming mask in some embodiments. For example, U.S. Pat. Nos. 4,349,329 and 4,298,328 disclose die structures comprising skin-forming masks. The die body may incorporate feedholes leading to, and intersecting with, an array of discharge slots formed in a die outlet face, through which the ceramic-forming batch mixture is extruded. The mask can be employed to form an outer peripheral skin in some embodiments. The mask can be a ring-like circumferential structure, such as in the form of a collar, defining the outer peripheral shape of the outer peripheral skin of the honeycomb body. The outer peripheral skin of the honeycomb body can be formed by extruding the ceramic-forming batch mixture between the mask and the die body as described below. In other embodiments, especially in large honeycomb bodies, the skin may be after applied as a cement material that is provided to the periphery of the honeycomb body after firing. Any suitable method may be used to provide an after-applied skin.

Certain channels in the honeycomb body may be plugged for use in a filter wherein exhaust gas is filtered by passing the gas flow through the porous walls of the honeycomb body. Accordingly, the porous walls may filter components (e.g., soot) within the honeycomb body. In addition, some or all of the porous walls of the honeycomb body can include an on-wall or in-wall catalyst disposed thereon or therein as a washcoat containing a suitable catalyst, such as for Nox, Sox, CO, or other species to be abated. In some embodiments described herein, some of the channels (e.g., outlet channels) are plugged at the inlet end of the honeycomb body and other channels (e.g., inlet channels) are plugged at the outlet end of the honeycomb body. Such a plugging arrangement forces gas into at least some of the inlet channels, through the porous walls, where the gas is filtered to remove particulates, and into the outlet channels where the filtered gas exits from the honeycomb body. When viewed from the inlet end, in some embodiments, the channels may be arranged so that they alternate between channels that are plugged at the inlet end (e.g., outlet channels) and channels that are not plugged at the inlet end and are plugged at the outlet end (e.g., inlet channels), such as in a checkerboard or other pattern.

Some plugged honeycomb bodies provide an increased inlet volume wherein the size (e.g., cross-sectional area) of at least some of the inlet channels is large relative to the size (e.g., cross-sectional area) of at least some of the outlet channels in order to provide increased ash storage in the relatively larger inlet channels. Such honeycomb bodies are referred to herein as comprising asymmetric channels, as having asymmetric channel sizes or an asymmetric channel design. While such asymmetric channel designs provide reduced frequency of filter regeneration intervals, the extent to which the hydraulic diameter ratio can be increased can be limited by the increase in pressure drop that results as the size of the outlet channels (e.g., the hydraulic diameter of the outlet channels) decreases. If the inlet-to-outlet channel size ratio is increased beyond a certain level, the smaller size of the outlet channels can result in a quite large penalty in pressure drop across the honeycomb body. In addition, die design and die manufacture becomes more difficult and costly with smaller outlet channels.

In addition to the foregoing, in such asymmetric channel designs, the position of a first wall separating a first pair of inlet channels and outlet channels from one another is relatively offset from a second wall separating an adjacent second pair of inlet and outlet channels. This wall offset increases in direct relationship as the ratio of hydraulic diameters between the inlet channels and the outlet channels increases. Such larger offsets can reduce the load carrying capacity of honeycomb bodies relative to a honeycomb bodies comprising walls that are not offset from one another. Further, complications may also arise during extrusion and other processing of honeycomb bodies comprising these offset walls. For example, the honeycomb bodies may be more likely to deform and slump in their green state.

As described above, the channels may be arranged in an asymmetric channel pattern wherein the inlet channels have greater cross-sectional areas and hydraulic diameters than the outlet channels in some embodiments. Asymmetric channel patterns can place unique stresses on porous walls at the intersections of cell channels during firing and/or other manufacturing processes, and sometimes in use. These stresses can cause unwanted cracking of the porous walls. Certain wall dimensions, channel dimensions, ratios, and/or other criteria in honeycomb structures within honeycomb bodies are described herein that substantially reduce the likelihood of the honeycomb bodies to crack during firing, other manufacturing processes, and in use within plugged honeycomb bodies for filters, for example.

These and other embodiments of honeycomb bodies and honeycomb structures (e.g., honeycomb structures within honeycomb bodies), and honeycomb extrusion dies according to the present disclosure are described below with reference to FIGS. 1A-6B herein.

Figure 1B:
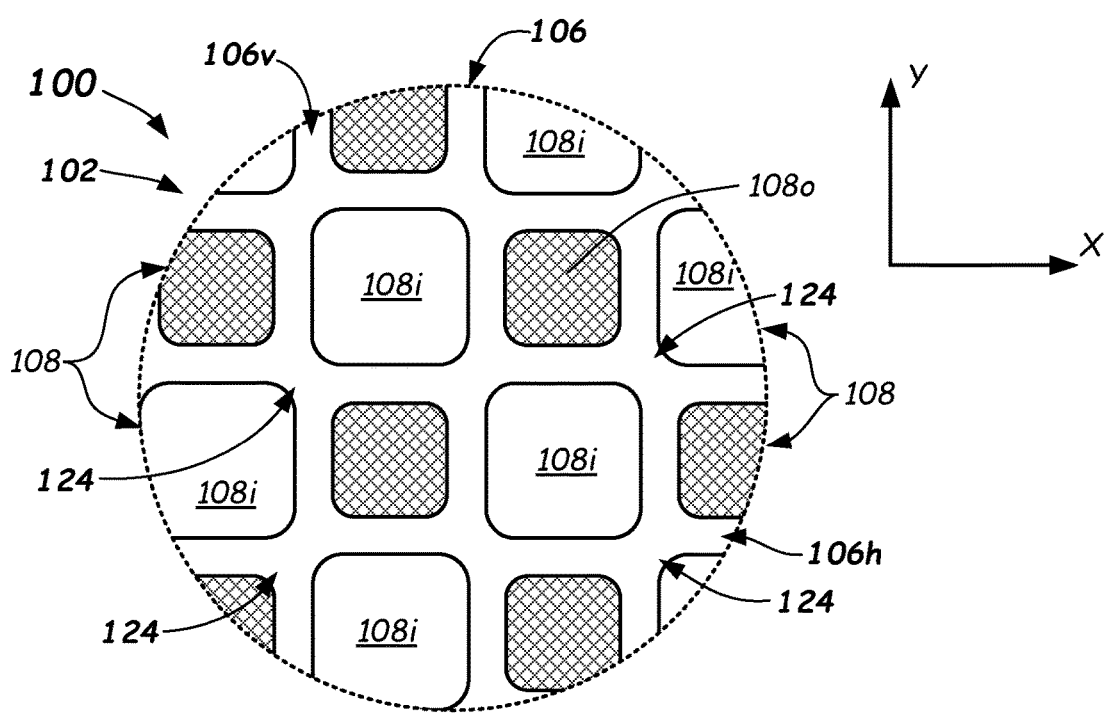
FIG. 1B schematically illustrates an enlarged end view of a portion of the inlet end of the honeycomb body of FIG. 1A according to embodiments disclosed herein.

FIG. 1A schematically illustrates a perspective view of a honeycomb body 100 and FIG. 1B schematically illustrates an enlarged front view of a portion of an inlet end 102 of the honeycomb body 100. The inlet end 102 may be bounded by an outer periphery 103, such as a cylindrical outer periphery shown. However other outer periphery shapes are possible. The honeycomb body 100 may comprise a length L extending between the inlet end 102 and an outlet end 104, wherein the inlet end 102 may be configured to receive gas (e.g., exhaust gas) and the outlet end 104 may be configured to expel the gas. A peripheral skin 105 extending along the length L may be applied to the periphery as an after-applied skin or extruded along with the matrix of the honeycomb body 100 and the outer portion thereof may define the periphery 103.

The honeycomb body 100 may comprise a honeycomb structure 110 comprising a matrix of intersecting porous walls 106 forming channels 108 that may extend along the length L of the honeycomb structure 110 and honeycomb body 100 from the inlet end 102 to the outlet end 104. The porous walls 106 form the honeycomb structure 110 within the honeycomb body 100. The honeycomb structure 110, a portion of which is shown in FIG. 1B, may comprise horizontally-extending walls 106h that extend in an X-direction and vertically-extending walls 106v that extend in a Y-direction, wherein the Y-direction is perpendicular to the X-direction as shown. The X-direction and Y-direction are used for reference only herein.

The honeycomb body 100 may further comprise at least two types of channels 108, inlet channels 108*i* and outlet channels 108*o*. The inlet channels 108*i* can be larger in cross-sectional area Ai and hydraulic diameter HDi than the cross-sectional area Ao and hydraulic diameter HDo of the outlet channels. In the depicted embodiment, the outlet channels 108*o* may be plugged proximate the inlet end 102 and are shown as shaded in FIGS. 1A and 1B. The inlet channels 108*i* may be plugged proximate the outlet end 104 (not shown in FIG. 1B). In the embodiment depicted in FIGS. 1A and 1B, there can be approximately one outlet channel 108*o* for every inlet channel 108*i*. The channels 108 may be arranged in a checkerboard pattern of alternating inlet channels 108*i* and outlet channels 108*o* in both the X-direction and the Y-direction, as shown. In other embodiments, there may be more inlet channels 108*i* than outlet channels 108*o*. In yet other embodiments, some channels may be pass-through (unplugged at either end) channels.

In the depicted embodiment, the greater inlet cross-sectional areas and inlet hydraulic diameters HDi than outlet hydraulic diameters HDo of the outlet channels 108*o* improves the filtering properties of the honeycomb body 100, such as by allowing more soot to be accumulated before a regeneration event is performed, as well as providing for a lower back pressure build-up rate. Such a channel pattern wherein channels have different sizes is referred to as an asymmetric channel pattern. The ratio of inlet hydraulic diameter to outlet hydraulic diameter (e.g., HDi:HDo) may range from about 1.1 to 1.6. In other embodiments, the ratio of inlet hydraulic diameters to outlet hydraulic diameters may range from 1.2 to 1.6, 1.2 to 1.4, or 1.4 to 1.6. Other ratios of hydraulic diameters may be used.

Figure 2:
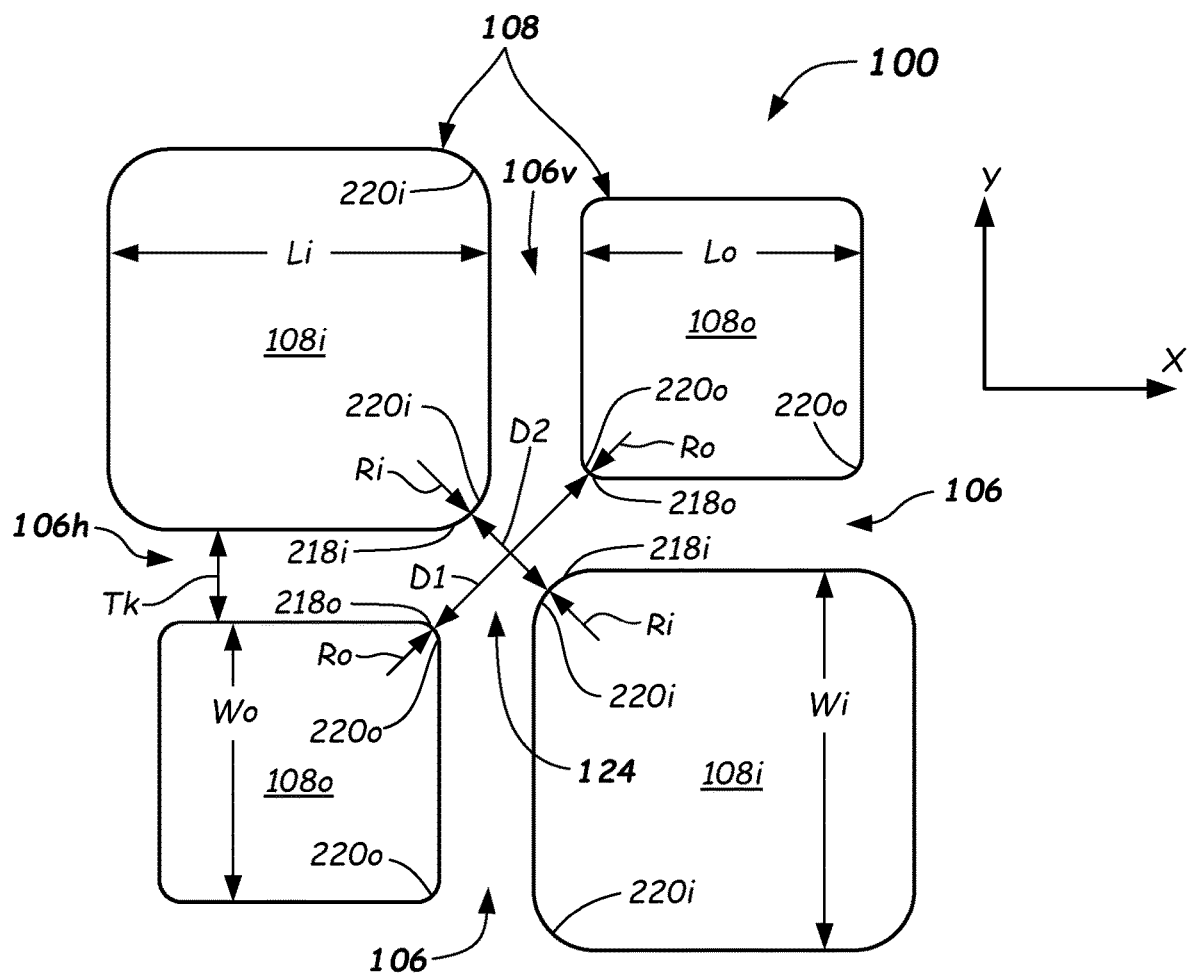
FIG. 2 schematically illustrates an enlarged end view of four adjacent channels of a honeycomb structure, comprising two adjacent inlet channels and two adjacent outlet channels, and illustrating dimensions and configuration of a centerpost according to embodiments disclosed herein.

Now referring to FIGS. 1 and 2, the structure of a region of intersection of the porous walls will now be described. FIG. 2 schematically illustrates an enlarged end view of four channels 108 comprising two adjacent inlet channels 108*i* and two adjacent outlet channels 108*o*. The shading denoting plugs in the outlet channels 108*o* is not included in FIG. 2 for illustration purposes. As described above, the cross-sectional areas Ai and inlet hydraulic diameters HDi of at least some of the inlet channels 108*i* may be greater than the cross-sectional areas and outlet hydraulic diameters HDo of at least some of the outlet channels 108*o* in some embodiments. The cross-sectional shapes of the channels 108 may be square and/or rectangular with fillets forming curves at the respective vertices of the squares and/or rectangles.

For example, the inlet channels 108*i* may comprise inlet fillets 218*i* forming curved inlet corners 220*i*. The outlet channels 108*o* may comprise outlet fillets 218*o* forming curved outlet corners 220*o*. The inlet channels 108*i* may comprise inlet radii Ri at least partially defining the inlet corners 220*i* and the outlet channels 108*o* may comprise outlet radii Ro at least partially defining the outlet corners 220*o*.

The inlet radii Ri and outlet radii Ro may differ in size depending on factors including the hydraulic diameters HDi, HDo of the inlet channels 108*i* and outlet channels 108*o*, channel density (CD), and wall thickness Tk as described in greater detail below. In some embodiments, the inlet radii Ri may be greater than the outlet radii Ro. In some embodiments the inlet radii Ri may be in a range from 10 mils (0.25 mm) to 20 mils (0.51 mm) and the outlet radii Ro may be in range from 4 mils (0.10 mm) to 8 mils (0.20 mm). In other embodiments, the inlet radii Ri may be in a range from 10 mils (0.25 mm) to 14 mils (0.35 mm) and the outlet radii Ro may be in a range from 5 mils (0.13 mm) to 7 mils (0.18 mm). In some embodiments, the outlet radii Ro may be less than or equal to 7 mils (0.18 mm), so that the back pressure may be reduced. The inlet radii Ri and outlet radii Ro may comprise other dimensions.

In some embodiments, the inlet radii Ri and outlet Ro may be expressed as a radius ratio of the inlet radii Ri to the outlet radii (e.g., radius ratio Ri:Ro). For example, the radius ratio Ri:Ro may be in the range from 1.5 to 4.0, from 2.0 to 4.0, from 2.0 to 3.5, from 2.0 to 3.5, from 3.1 to 3.5, from 2.9 to 3.3, from 3.2 to 3.4, or less than or equal to 3.5 in some embodiments. In other embodiments, the radius ratio Ri:Ro can be in a range from 2.0 to 2.5, in a range from 2.0 to 2.2, or less than or equal to 2.2. Other radius ratios Ri:Ro of the inlet radii Ri to the outlet radii Ro may be used in the honeycomb body 100. The selected hydraulic diameters, radii, and radius ratio Ri:Ro can be selected to control the stresses imparted at the intersection region.

The intersecting porous walls 106 define the channels 108 and comprise wall thicknesses Tk (FIG. 2). The wall thicknesses Tk may extend between parallel portions of adjacent inlet channels 108*i* and outlet channels 108*o* so as not to include the inlet corners 220*i* or the outlet corners 220*o*. The wall thicknesses T may range from 2 mils (0.05 mm) to 20 mils (0.51 mm), from 2 mils (0.05 mm) to 15 mils (0.38 mm), from 2 mils (0.05) to 13 mils (0.33 mm), from 4 mils (0.10 mm) to 10 mils (0.25 mm), from 5 mil (0.13 mm) to 10 mils (0.25 mm), from 7 mils (0.18 mm) to 10 mils (0.25 mm). In other embodiments, the wall thicknesses Tk may range from 5 mils (0.13 mm) to 8 mils (0.20 mm). In other embodiments, the wall thicknesses Tk may be less than or equal to 8 mils (0.13 mm), or even less than or equal to 7 mils (0.20 mm). The wall thicknesses Tk may have other dimensions. Thinner walls provide lower back pressure and are desirable provided suitable stresses can be provided by proper selection of dimensions of the intersection region.

The channels depicted in FIGS. 1A-2 may be square or substantially square. The inlet channels 108*i* may comprise lengths Li and widths Wi extending between parallel walls 106 of the inlet channels 108*i* so as not to include the inlet corners 220*i*. The outlet channels 108*o* may comprise lengths Lo and widths Wo extending between parallel walls 106 of the outlet channels 108*o* so as not to include the outlet corners 220*o*. The lengths Li and widths Wi may range from 40 mils (1.0 mm) to 70 mils (1.8 mm) and in other embodiments, the lengths Li and widths Wi range from between 58 mils (1.5 mm) to 65 mils (1.7 mm). The lengths Lo and widths Wo may range from 38 mils (0.97 mm) to 54 mils (1.4 mm), and in other embodiments the lengths Lo and widths Wo may range from 43 mils (1.1 mm) to 49 mils (1.2 mm). The lengths Li, Lo and widths Wi, Wo of the inlet channels 108*i* and the outlet channels 108*o* may comprise other dimensions, including rectangular dimensions. In some embodiments Li=Wi and Lo=Wo.

The honeycomb structure 110 of the honeycomb body 100 may comprise centerposts 124 (a few labeled) located at the intersection of vertically-extending walls 106*v* and horizontally-extending walls 106*h*. The centerposts 124 may also be defined by the opposing inlet corners 220*i* of two inlet channels 108*i* and the opposing outlet corners 220*o* of two outlet channels 108*o*. For example, the centerposts 124 may be partially defined in one extent (e.g., the narrow extent) by the inlet corners 220*i* of adjacent inlet channels 108*i*, and to another extent (e.g., the longest extent) by the adjacent outlet corners 220*o* and outlet channels 108*o*.

With reference to FIG. 2, a first diagonal length D1 of centerpost 124 may extend between two opposing outlet corners 220o of outlet channels 108o located directly adjacent to and at least partially forming the centerpost 124. In some embodiments, the first diagonal length D1 is the shortest distance between the two opposing outlet corners 220o of the opposing outlet channels 108o. A second diagonal length D2 may extend between two opposing inlet corners 220i of opposing inlet channels 108i located directly adjacent and at least partially forming the centerpost 124. In some embodiments, the second diagonal length D2 is the shortest distance between the two opposing inlet corners 220i of the opposing inlet channels 108i. In some embodiments, the first diagonal length D1 may be in the range of 26 mils (0.66 mm) to 32 mils (0.81 mm) and the second diagonal length D2 may be in the range of 10 mils (0.25 mm) to 18 mils (0.46 mm). Further, the second diagonal length D2 may be in the range of 12 mils (0.30 mm) to 15 mils (0.38 mm) in some embodiments.

The aforementioned examples of the first diagonal length D1 and the second diagonal length D2 may be in honeycomb structures. The honeycomb structures can comprise ratios of hydraulic diameters HDi:HDo that are in the range of 1.4 to 1.6. In some embodiments, the second diagonal length D2 may be in the range of 14 mils (0.36 mm) to 17 mils (0.43 mm), such as when HDi:HDo is in the range of 1.2 to 1.4.

In other embodiments, the first diagonal length D1 may be from 27 mils (0.63 mm) to 30 mils (0.76 mm) in some embodiments. The second diagonal D2 may be in the range from 12 mils (0.30 mm) to 18 mils (0.46 mm), from 10 mils (0.25 mm) to 16 mils (0.41), or from 12 mils (0.30 mm) to 15 mils (0.38) in some embodiments.

Some conventional honeycomb structures have increased their inlet hydraulic diameters by techniques including decreasing the radii of the curved corners of the inlet channels. In doing so, the equivalent diagonal lengths D2 have decreased, which in turn has increased the aspect ratios D1:D2. As described below, high aspect ratios D1:D2 may weaken the conventional honeycomb structures. For example, during firing and/or other processes applied to conventional honeycomb structures during manufacturing, the high aspect ratios D1:D2 may increase the likelihood of cracking of traditional honeycomb structures proximate the centerposts. The problems associated with traditional honeycomb structures are exacerbated by the asymmetrical channels, which may cause additional stress in the walls forming the centerposts. For example, the horizontal and vertical walls may comprise bends proximate the centerposts, which decreases the strength of the honeycomb structures.

The honeycomb body 100 disclosed herein may comprise a relatively small aspect ratio D1:D2, which improves the strength of the honeycomb body 100 relative to conventional honeycomb bodies. For example, the small aspect ratio D1:D2 improves the ability of the honeycomb body 100 to withstand firing during production where the honeycomb body 100 undergoes thermal stress. In some embodiments, fractures proximate the centerposts 124 are less likely to occur when the aspect ratio D1:D2 is less than a predetermined value, such as less than 2.7. In other embodiments, the aspect ratio D1:D2 is less than 2.0. In some embodiments, the aspect ratio D1:D2 is at least partially dependent on the hydraulic diameter ratio HDi:HDo. In some embodiments, the aspect ratio D1:D2 can be in the range of: 1.5 and 2.0; 1.6 and 2.0; 1.0 and 1.9; 1.5 and 1.8; 1.5 and 1.85; or in the range from 1.7 and 1.9. In other embodiments, the aspect ratio D1:D2 can be in the range of: 1.5 and 2.5; 1.9 and 2.5; 1.5 and 2.3; 2.1 and 2.3; 1.5 and 2.25. The honeycomb body 100 may comprise other values of the aspect ratio D1:D2.

The aspect ratio D1:D2 may be adjusted or set by varying the radii of the inlet fillets 218i and the outlet fillets 218o. For example, small increases in the inlet radii Ri may increase the inlet fillets 218i, which increases the second diagonal D2 and lowers the aspect ratio D1:D2. At some point, the inlet radii Ri may reach a point to where gas flow through the inlet channels 108i can be significantly reduced. In such situations, the outlet radii Ro may be decreased, which decreases the diagonal D1 and the aspect ratio D1:D2.

The above-described aspect ratios D1:D2 and other dimensions may not be applicable proximate to channels 108 and centerposts 124 located adjacent the periphery 103 of either the inlet end 102 or the outlet end 104 of the honeycomb body 100.

Figure 3:
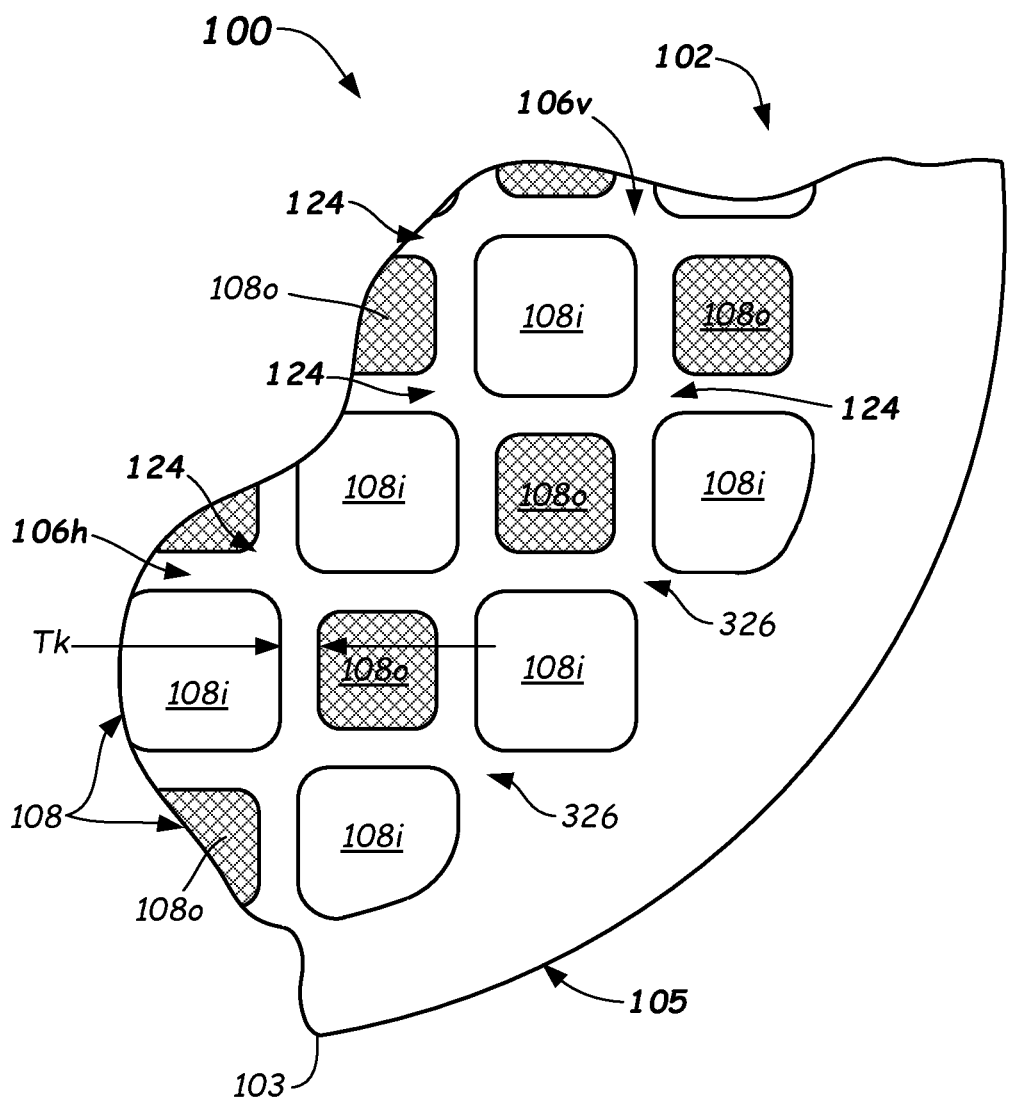
FIG. 3 schematically illustrates an enlarged end view of a portion of an inlet end of a honeycomb body proximate an outer periphery of a honeycomb body according to embodiments disclosed herein.

FIG. 3 schematically illustrates a portion of the inlet end 102 of the honeycomb body 100 adjacent the periphery 103. As shown, the channels 108 abutting the periphery 103 may be irregular-shaped, so some of posts adjacent to these incomplete and irregular-shaped channels 108 may not comprise the first diagonal length D1 and/or the second diagonal length D2 as described above. For example, in the embodiment depicted in FIG. 3, posts 326 are at least partially formed by two inlet channels 108i wherein at least one is irregularly shaped. In other embodiments, posts 326 may be formed by an inlet channel 108i and an outlet channel 108o (not shown) wherein at least one is irregularly shaped. Accordingly, an equivalent length to the diagonal length D1 cannot exist in the post 326. Based on the foregoing, the above-described diagonal lengths D1 and D2 may only be present in centerposts 124 located away from the periphery 103.

Table 1 below provides example dimensions of the honeycomb body 100 including centerposts 124. The honeycomb structure comprises the channel density (CD) in cpsi, wall thickness Tk in mils, Ro in inches, Ri in inches, dimensionless radius ratio Ri:Ro, aspect ratio D1:D2, inlet hydraulic diameter HDi and outlet hydraulic area HDo, and a hydraulic diameter ratio HDi:HDo of the honeycomb bodies 100. For reference, in example #1, the 400/7 honeycomb structure 100 may comprise a channel density CD of about 400 channels per square inch (cpsi) (62 channels per square centimeter (cpscm)), a wall thicknesses Tk of about 7.3 mils, Ro of 5.5 mils, Ri of 18 mils, Ri:Ro of 3.25, D1:D2 of 2.2, and a hydraulic diameter ratio HDi:HDo of 1.5. The 300/9 honeycomb structure may comprise CD of about 300 cpsi (47 cpscm) and a wall thickness Tk of about 9 mils (0.23 mm).

TABLE 1

Honeycomb Structure Dimensions

| Ex # | CD cpsi | Tk inch | Ro inch | Ri inch | Ri:Ro | D1:D2 | Lo, Wo inch | Li, Wi inch | HDi | HDo | HDi:HDo |
|---|---|---|---|---|---|---|---|---|---|---|---|
| 1 | 400 | 0.0073 | 0.0055 | 0.018 | 3.25 | 2.20 | — | — | — | — | 1.5 |
| 2 | 400 | 0.0066 | 0.0063 | 0.018 | 2.90 | 2.03 | 0.037 | 0.055 | 0.055 | 0.037 | 1.5 |
| 3 | 300 | 0.0095 | 0.0062 | 0.013 | 2.10 | 1.80 | — | — | — | — | 1.3 |
| 4 | 300 | 0.0098 | 0.0050 | 0.010 | 2.00 | 1.87 | 0.043 | 0.057 | 0.057 | 0.043 | 1.3 |
| 5 | 300 | 0.0097 | 0.0061 | 0.013 | 2.15 | 1.68 | 0.044 | 0.058 | 0.058 | 0.044 | 1.3 |
| 6 | 300 | 0.0096 | 0.0062 | 0.013 | 2.13 | 1.69 | 0.044 | 0.058 | 0.058 | 0.044 | 1.3 |
| 7 | 300 | 0.0070 | 0.0061 | 0.013 | 2.15 | 1.88 | 0.046 | 0.061 | 0.061 | 0.046 | 1.3 |

Figure 4:
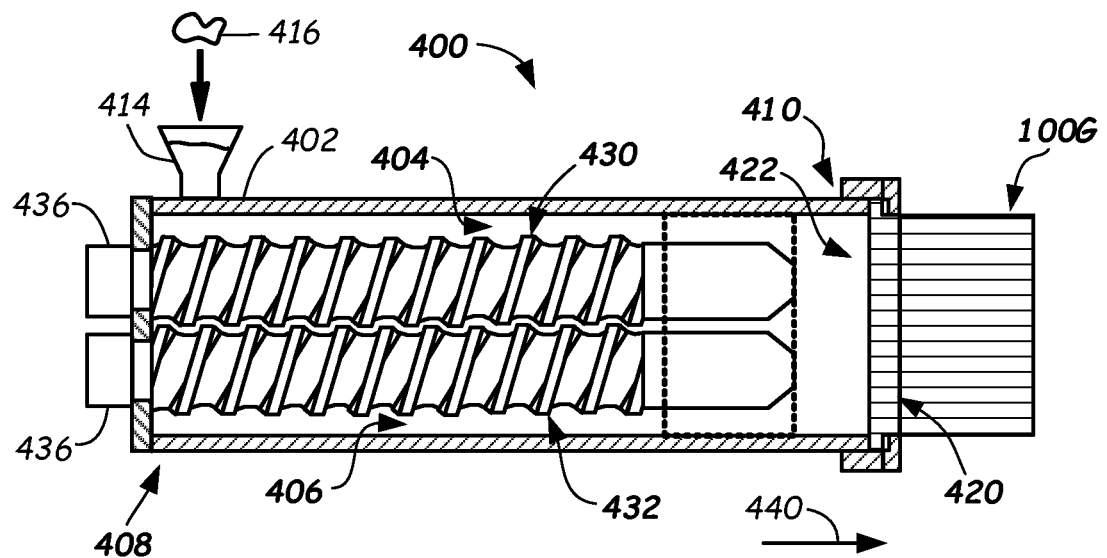
FIG. 4 schematically illustrates a cross-sectioned side view of an embodiment of an extruder according to embodiments disclosed herein.

FIG. 4 shows a cross-sectioned side view of an embodiment of an extruder 400 (e.g., a continuous twin-screw extruder) that may be used to extrude the honeycomb body 100 (FIG. 1) comprising the honeycomb structure. The extruder 400 may comprise a barrel 402 comprising a first chamber portion 404 and a second chamber portion 406 formed therein and in communication with each other. The barrel 402 can be monolithic or it can be formed from a plurality of barrel segments connected successively in the longitudinal (e.g., axial) direction. The first chamber portion 404 and the second chamber portion 406 extend through the barrel 402 in the longitudinal direction between an upstream side 408 and a downstream side 410. At the upstream side 408 of the barrel 402, a material supply port 414, which can comprise a hopper or other material supply structure, may be provided for supplying a batch mixture 416 to the extruder 400. The batch mixture may be provided as pugs of premulled and plasticized batch or as other sized globules, which may be provided continuously or intermittently. A honeycomb extrusion die 420 is provided at a discharge port 422 at the downstream side 410 of the barrel 402 for extruding the batch mixture 416 into a desired shape, such as green honeycomb body 100G or the like. The honeycomb extrusion die 420 may be coupled with respect to the discharge port 422 of the barrel 402, such as at an end of the barrel 402. The honeycomb extrusion die 420 can be preceded by other structures, such as a generally open cavity, screen/homogenizer (not shown), or the like to facilitate the formation of a steady plug-type flow front before the batch mixture 416 reaches the honeycomb extrusion die 420.

As shown in FIG. 4, a pair of extruder screws may be mounted in the barrel 402. A first screw 430 can be rotatably mounted at least partially within the first chamber portion 404 and a second screw 432 can be rotatably mounted at least partially within the second chamber portion 406. The first screw 430 and the second screw 432 may be arranged parallel to each other, as shown, though they may also be arranged at various angles relative to each other. The first screw 430 and the second screw 432 may also be coupled to a driving mechanism outside of the barrel 402 for rotation in the same or different directions. It is to be understood that both the first screw 430 and the second screw 432 may be coupled to a single driving mechanism (not shown) or, as shown, to individual driving mechanisms 436. The first screw 430 and the second screw 432 move the batch mixture 416 through the barrel 402 with pumping and mixing action in an axial direction 440. Further supporting structure (shown dotted) may be provided to support the first screw 430 and the second screw 432 along their lengths. Such support structure may comprise perforations or holes therein to allow the batch mixture 416 to flow through the support structure.

Figure 5:
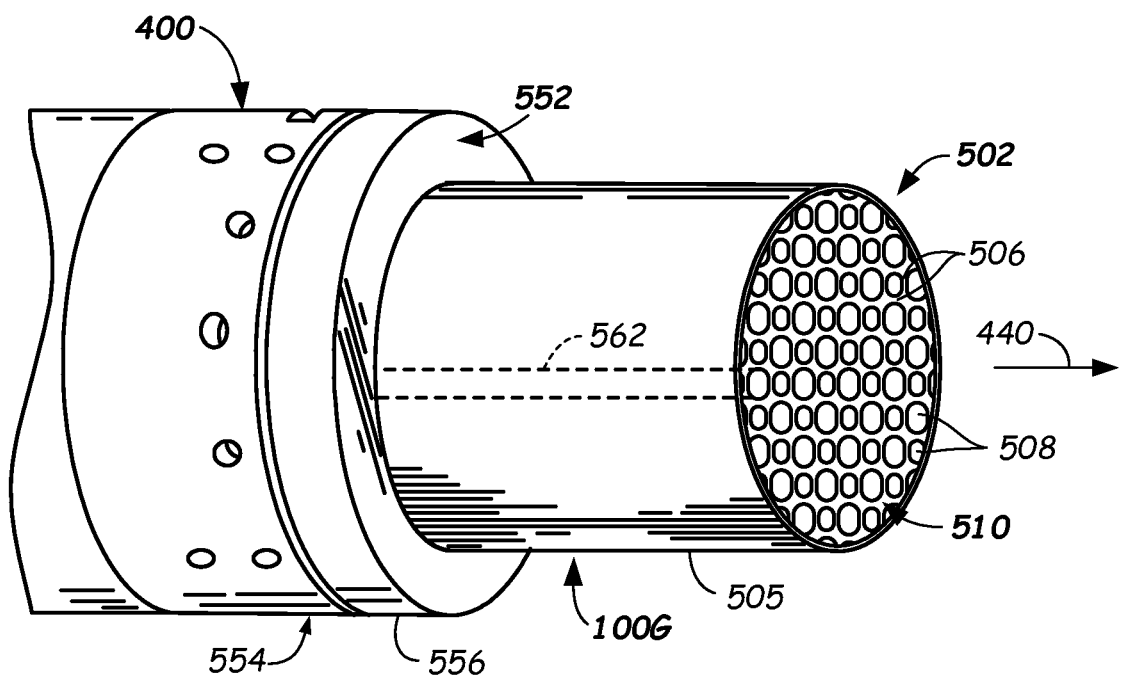
FIG. 5 schematically illustrates a perspective view an end of an extruder and a green honeycomb body (extrudate) being extruded therefrom according to embodiments disclosed herein.

FIG. 5 is a perspective illustration showing an end of the extruder 400 and a green honeycomb body 100G (e.g., an extrudate) being extruded therefrom. The extruder 400 is shown with an extruder front end 552 being where the batch mixture 416 exits the extruder 400 as the green honeycomb body 100G. An extruder cartridge 554 located proximate the extruder front end 552 may comprise extrusion hardware such as the honeycomb extrusion die 420 (FIG. 4) and a skin forming mask 556. The green honeycomb body 100G comprises a first end face 502, which becomes the inlet end 102 (FIG. 1) after the green honeycomb body 100G is processed.

The green honeycomb body 100G may comprise a plurality of channels 508, and an outer peripheral surface 505. The channels 508 may not be drawn to scale for illustration purposes. A plurality of intersecting walls 506 may form the channels 508 that extend in an axial direction 440. For example, intersecting walls 506 forming a channel 562 extending in the axial direction 440 are shown by dashed lines for illustration. The intersecting walls 506 may form a honeycomb structure 510 within the green honeycomb body 100G. The cross-section of the first end face 502 of the green honeycomb body 550 depicted in FIG. 5 is circular, but it may have other shapes, such as rectangular, elliptical, racetrack shape, square, triangular or tri-lobed, hexagonal, octagonal, asymmetrical, symmetrical, or other desired shapes, and combinations of the afore-mentioned.

Figure 6A:
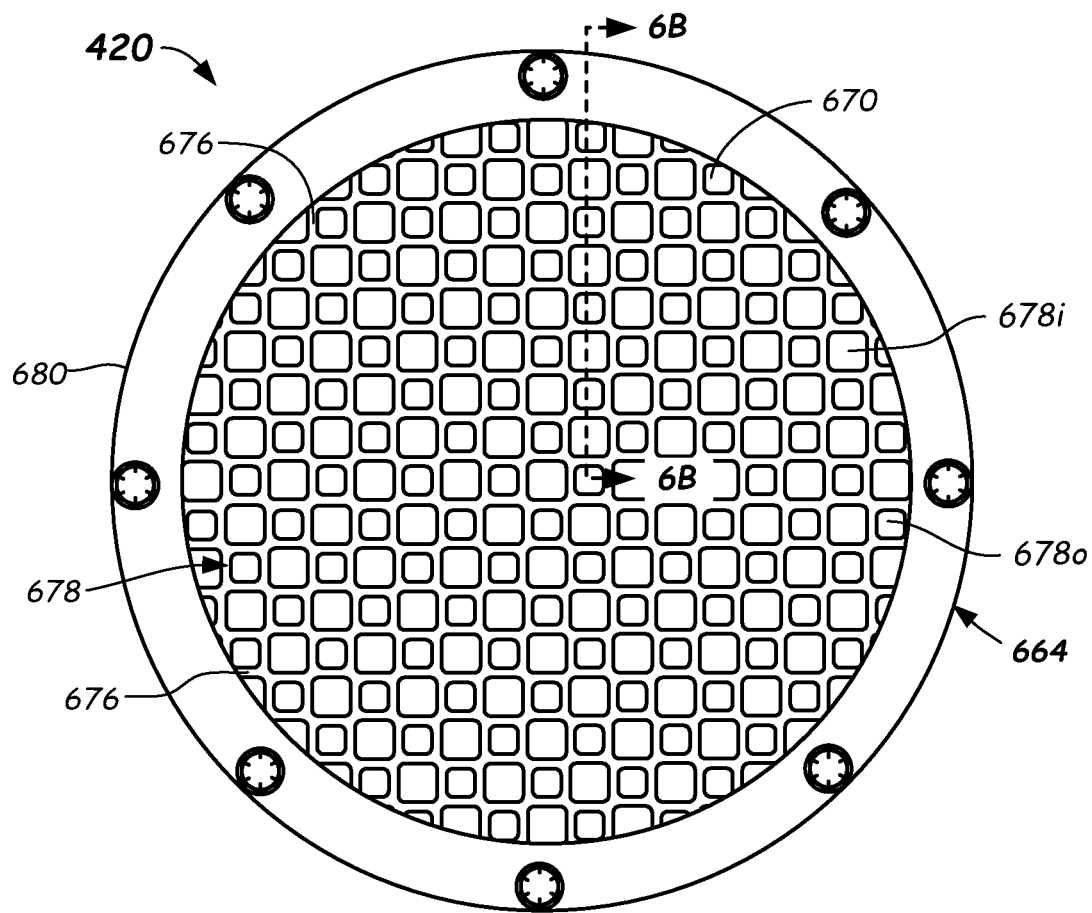
FIG. 6A schematically illustrates a plan view of an outlet end of an extrusion die configured to extrude a honeycomb structure or body according to embodiments disclosed herein.
Figure 6B:
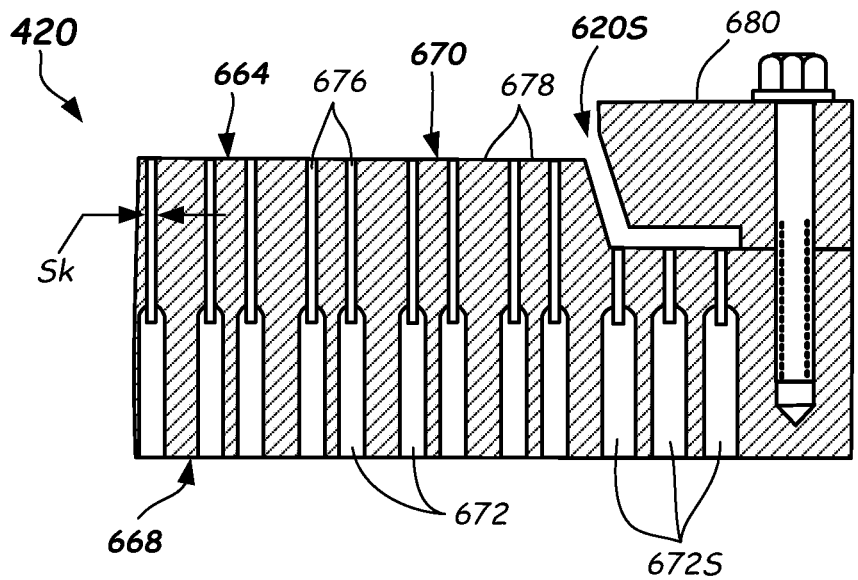
FIG. 6B schematically illustrates a partial cross-sectional side view of the extrusion die of FIG. 6A taken along section line 6B-6B according to embodiments disclosed herein.

FIG. 6A illustrates a front view of the honeycomb extrusion die 420 and FIG. 6B illustrates a partial cut away view of the honeycomb extrusion die 420. The honeycomb extrusion die 420 may be configured to manufacture the green honeycomb body 100G and from that the honeycomb body 100 may be manufactured. The honeycomb bodies may be formed by extrusion of the batch mixture 416, which is described, for example, in U.S. Pat. Nos. 3,885,977, 5,332,703, 6,391,813, 7,017,278, 8,974,724, WO2014/046912, and WO2008/066765, through the honeycomb extrusion die 420 to produce the green honeycomb body 100G (FIG. 5). The green honeycomb body 100G may then be dried, such as described in U.S. Pat. Nos. 9,038,284, 9,335,093, 7,596,885, and 6,259,078, for example. Other drying processes may be used. The green honeycomb body 100G may then be cut to length and fired, such as described in U.S. Pat. Nos. 9,452,578, 9,446,560, 9,005,517, 8,974,724, 6,541,407, or U.S. Pat. No. 6,221,308 to form the honeycomb body 100 (FIG. 1) or other honeycomb structures described herein. Any suitable cutting, forming, drying, and/or firing methods may be used.

The honeycomb extrusion die 420 can comprise a die body 664 such as a metal disc, a die inlet face 668 configured to receive the batch mixture 416 from the extruder 400, and a die outlet face 670 opposite from the die inlet face 668 and configured to expel plasticized batch in the form of a green honeycomb body 100G (extrudate). The honeycomb extrusion die 420 may be coupled to the extruder 400 that forces the batch mixture 416 under pressure through the honeycomb extrusion die 420.

The honeycomb extrusion die 420 may comprise a plurality of feedholes 672 (a few labeled) extending from the die inlet face 668 into the die body 664. The plurality of feedholes 672 intersect with an array of slots 676 (a few labeled) extending into the die body 664 from the die outlet face 670. The plurality of slots 676 may comprise a slot thickness Sk measured transversely across the slots 676. The slot thickness Sk may be selected based on the total shrinkage of the batch mixture 416 (FIG. 4) that is used (e.g., shrinkage from extrusion through firing) so that the fired honeycomb body 100 (FIG. 1) comprises a transverse wall thickness Tk (FIG. 2) of the intersecting porous walls 106 as described herein. For example, for a nominal extrude-to-fire shrinkage of 12%, the slot thickness Sk and may be selected to be up to 12% greater than the transverse wall thickness Tk (FIG. 2) of the intersecting porous walls 106. Die dimensions disclosed herein can be as-machined dimensions if the extrusion die 420 is uncoated with a wear-reducing coating or can comprise as-coated dimensions if the extrusion die 420 is coated.

The plurality of feedholes 672 connect with, and can be configured to feed batch mixture to, the array of slots 676. The array of slots 676 intersect with one another and themselves as shown in FIG. 6A. The array of slots 676 form an array of die pins 678 (a few labeled) that are arranged in a die pin structure across the die outlet face 670. The die pins 678 may comprise smaller pins 678o that form the outlet channels 108o (FIG. 2) and larger pins 678i that form the inlet channels 108i (FIG. 2). The density of the die pins 678 may be the same as the channel density of the channels 108 of the honeycomb body 100 (FIG. 2) or slightly adjusted for shrinkage.

In the depicted embodiment, the slots 676 may be formed by a plunge electron discharge machining (EDM) process, for example. Other suitable die manufacturing methods may be used. In some embodiments, the inlet fillets 218i (FIG. 2) and outlet fillets 218o can be formed by plunge EDM or other suitable method to round the vertices of the die pins 678. Each of the die pins 678 may be square or rectangular in transverse cross-sectional shape including fillets so as to form the channels 108 (FIG. 2) in the honeycomb body 100. The honeycomb extrusion die 420 may comprise a skin-forming portion 620S comprising a skin-forming mask 680 (e.g., a ring-shaped article) that interfaces with batch mixture 416 from the skin forming feedholes 672S and recessed skin-forming region outboard of the die outlet face 670 to form an extruded skin 105 on the green honeycomb body 100G formed during the extrusion method.

The honeycomb body 100 (FIG. 1) may comprise different dimensions that may be adjusted for shrinkage to provide applicable dimensions of the honeycomb extrusion die 420. Many of these dimensions are described below.

Channel Density (CD)

The channel density (CD) may be in a range from 250 channels per square inch (cpsi) to 450 cpsi in some embodiments. CD may be in a range from 275 cpsi to 425 cpsi, or a range from 290 cpsi to 410 cpsi. In other embodiments, CD may be from 250 cpsi to less than 350 cpsi. In yet other embodiments, CD may be from 350 cpsi to 450 cpsi.

Wall Thickness (Tk)

The porous walls 106 comprise a transverse wall thickness Tk in a range from 2 mils (0.05 mm) to 20 mils (0.51 mm), in a range from 2 mils (0.05 mm) to 15 mils (0.38 mm), in a range from 2 mils (0.05 mm) to 13 mils (0.33 mm), from 4 mils (0.10 mm) to 10 mils (0.25 mm), from 5 mils (0.13 mm) to 10 mils (0.25 mm), and from 7 mils (0.18 mm) to 10 mils (0.25 mm). In further thin wall embodiments, the porous walls 106 comprise transverse wall thickness Tk of less than or equal to 8 mils (0.20 mm), Tk of less than or equal to 7 mils (0.18 mm), or even from 5 mils (0.13 mm) to 8 mils (0.20 mm). With progression towards thinner and thinner porous walls 106, controlling the aspect ratio D1:D2 and/or radius ratio Ri:Ro is particularly beneficial to provide sufficient ISO strength and to minimize cracking at the wall intersections.

Ri, Ro, and Radius Ratio (Ri/Ro)

The value Ri may be in a range from 10 mils (0.25 mm) to 20 mils (0.51 mm), from 12 mils (0.30 mm) to 20 mils (0.51 mm), and from 10 mils (0.25 mm) to 14 mils (0.36 mm) in some embodiments. In other embodiments, the value Ri may be from 16 mils (0.41 mm) to 20 mils (0.51 mm), or from 12 mils (0.30 mm) to 16 mils (0.40 mm).

The value of Ro may be in a range from 5 mils (0.13 mm) to 10 mils (0.25 mm), from 5 mils (0.13 mm) to 8 mils (0.20 mm), or even from 5 mils (0.13 mm) to 7 mils (0.18 mm), or less than 7 mils (0.18 mm) in some embodiments.

The radius ratio Ri:Ro may be in a range from 1.5 to 4.0, from 1.5 to 3.5, from 2.0 to 3.5, 2.0 to 2.5, 2.0 to 2.2, and in some embodiments, less than or equal to 3.5, or even less than or equal to 2.2. In further embodiments, the radius ratio Ri:Ro may be in a range from 2.5 to 3.5, from 3.1 to 3.5, or from 2.9 to 3.3. In some embodiments, radius ratio Ri:Ro may be in a range from 3.2 to 3.4.

In some embodiments, radius ratio Ri:Ro may be less than or equal to 2.2. For example, Ri:Ro may be in a range from 1.6 to 2.2, such as for honeycomb bodies 100 having CD of 250 cpsi to less than 350 cpsi.

In some embodiments, Ri:Ro may be greater than or equal to 2.1, or between 2.1 and 3.5, or even between 2.1 and 3.4. In other embodiments, Ri:Ro may be from 2.9 to 3.5, or from 3.1 to 3.5, such as for CD of from 350 cpsi to 450 cpsi. In other embodiments, Ri:Ro may be from 3.2 to 3.4, or 2.9 to 3.3, such as for CD of from 350 cpsi to 450 cpsi.

D1, D2 and Aspect Ratio (D1:D2)

The value D1 may be in a range from 25 mils (0.64 mm) to 32 mils (0.82 mm). The value D2 may be in a range from 10 mils (0.25 mm) to 20 mils (0.51 mm), or even from 10 mils (0.25 mm) to 18 mils (0.46 mm).

The value of the aspect ratio D1:D2 may be less than 2.7, less than 2.3, or even less than 2.0 in some embodiments. In other embodiments, the aspect ratio D1:D2 may be in a range from 1.5 to 2.5, 1.5 to 2.3, from 1.5 to 2.25, 1.5 to 2.0, 1.5 to 1.9, 1.5 to 1.85, or 1.5 to 1.8. In other embodiments, the aspect ratio D1:D2 may be in a range from 1.9 to 2.5, and 2.1 to 2.3. If the value of D1:D2 is too small then the honeycomb body 100 will have too much mass and open frontal area (OFA) will be reduced. If the D1:D2 ratio is too large, then the honeycomb body 100 may have the propensity to crack.

Combinations of HDi:HDo and D1:D2

In some embodiments, the honeycomb body 100 can comprise an aspect ratio D1:D2 of less than 2.7 for when the hydraulic diameter ratio HDi:HDo is in a range from 1.4 to 1.6. In other embodiments, the aspect ratio D1:D2 can be less than 2.0 and the outlet corner radii Ro can be less than 7 mils when the hydraulic diameter ratio HDi:HDo is in a range from 1.2 to less than 1.4.

In addition to the foregoing dimensions, the honeycomb structure may comprise the following dimensions. The aspect ratio D1:D2 may be in a range from 1.5 to 2.3 and the hydraulic diameter ratio HDi:HDo may be in a range from 1.4 to 1.6. The aspect ratio D1:D2 may be in a range of 1.5 to 2.25 and the hydraulic diameter ratio HDi:HDo may range from 1.4 to 1.6. Furthermore, in some embodiments, the aspect ratio D1:D2 is less than 2.7, the hydraulic diameter ratio HDi:HDo may be from 1.4 to 1.6, and the radius ratio Ri:Ro can be greater than or equal to 2.5.

The aspect ratio D1:D2 may in a range of 1.5 to 1.9 and the hydraulic diameter ratio HDi:HDo may in a range from 1.2 to less than 1.4. The aspect ratio D1:D2 may range of 1.5 to 1.85 and the hydraulic diameter ratio HDi:HDo may be in a range from 1.2 to less than 1.4.

Further Combinations

In addition to the foregoing dimensions, the honeycomb body 100 may comprise dimensions wherein the channel density may be in a range from 350 cpsi to 450 cpsi, the porous walls comprise a wall thickness Tk in a range from 5 mil (0.13 mm) to 10 mil (0.25 mm), the hydraulic diameter ratio HDi:HDo is a range from 1.4 to 1.6, and the aspect ratio D1:D2 may be in a range from 2.0 to 2.3. Additionally, the radius ratio Ri:Ro may be in a range from 2.5 to 3.5, between 2.9 to 3.5, or even between 3.1 to 3.5, for example.

In addition to the foregoing dimensions, the honeycomb body 100 may comprise dimensions wherein the channel density (CD) may be in a range from 250 cpsi to less than 350 cpsi, the porous walls 106 comprise a transverse wall thickness Tk in a range from 7 mils (0.18 mm) to 10 mils (0.25 mm), the aspect ratio D1:D2 may in a range from 1.6 to 2.0, and the hydraulic diameter ratio HDi:HDo may be in a range from 1.2 to 1.4. In addition, the radius ratio Ri:Ro may be in a range from 2.0 to 2.2, or even 2.1 to 2.2.

In addition to the foregoing dimensions, the honeycomb body 100 may comprise, in some embodiments, CD in a range from 250 cpsi to less than 350 cpsi, the porous walls 106 may comprise a wall thickness Tk in a range from 7 mils (0.18 mm) to 10 mils (0.25 mm); the aspect ratio D1:D2 may range from 1.7 to 1.9, and the hydraulic diameter ratio HDi:HDo may range from 1.2 to 1.4. In addition, the radius ratio Ri:Ro may be in a range from 2.0 to 2.2.

In other embodiments, the honeycomb body 100 may comprise inlet radii Ri in a range from 10 mils (0.25 mm) to 14 mils (0.36 mm) and outlet radii Ro in a range from 5 mils (0.13 mm) to 7 mils (0.18 mm), the first diagonal length D1 in a range from 25 mils (0.64 mm) to 31 mils (0.79 mm), the second diagonal length D2 in a range from 12 mils (0.30 mm) to 18 mils (0.46 mm), the aspect ratio of D1:D2 in a range from 1.6 to 2.0, and a channel density (CD) in a range from 250 cpsi to less than 350 cpsi.

In other embodiments, the honeycomb body 100 may comprise the inlet radii Ri in a range from 16 mils (0.41 mm) to 20 mils (0.51 mm), the outlet radii Ro in a range from 4 mils (0.10 mm) to 7 mils (0.18 mm), the first diagonal length D1 in a range from 26 mils (0.66 mm) to 32 mils (0.81 mm), the second diagonal length D2 in a range from 10 mils (0.25 mm) to 16 mils (0.41 mm), the aspect ratio of D1:D2 in a range from 1.9 to 2.5, and the channel density (CD) in a range from 350 cpsi to 450 cpsi.

In other embodiments, the extrusion die 420 can include dimensions that produce honeycomb bodies 100 as described herein. The terms D1, D2, Ri, Ro, Li, Lo, Wi, and Wo when used in the context of the extrusion die 420 denote respective slot dimensions, die pin dimensions, and die pin radii of the region of the extrusion die 420 forming the centerposts 124 as is shown in FIG. 2. The honeycomb extrusion die 420 may comprise dimensions wherein the inlet pins 678i may comprise inlet corner radii Ri in a range from 10 mils (0.25 mm) to 14 mils (0.36 mm) and the outlet pins 678o may comprise outlet corner radii Ro in a range from 5 mils (0.13 mm) to 7 mils (0.18 mm). A first diagonal slot length D1 being a shortest distance between the opposing outlet corners of two of the outlet pins 678o may be in a range from 26 mils (0.66 mm) to 32 mils (0.81 mm). A second diagonal slot length D2 being a shortest distance between the opposing inlet corners of two inlet pins 678i may be in a range from 13 mils (0.33 mm) to 18 mils (0.46 mm). The aspect ratio of D1:D2 may be in a range from 1.6 to 2.0 and a die pin density may be in a range from 250 die pins per square inch (dppsi) to less than 350 dppsi.

Another embodiment of the honeycomb extrusion die 420 may comprise dimensions wherein the outlet radii Ro may be in a range from 4 mils (0.10 mm) to 7 mils (0.18 mm) and the inlet radii Ro may be in a range from 16 mils (0.41 mm) to 20 mils (0.51 mm). The first diagonal slot length D1 may be in a range from 26 mils (0.66 mm) to 32 mils (0.81 mm) and the second diagonal slot length D2 may be in a range from 10 mils (0.25 mm) to 16 mils (0.41 mm). The ratio of D1:D2 may be in a range from 1.9 to 2.5; and the die pin density may be in a range from 350 die pins per square inch (dppsi) to 450 dppsi.

The honeycomb extrusion die 420 may comprise a die pin density (DPD) of 275 die pins per square inch (dppsi) (43 die pins per square centimeter (dppscm)) to 450 dppsi (70 dppscm). In other embodiments, the honeycomb extrusion die 420 may comprise a DPD of 275 dppsi (43 (dppscm) to 410 dppsi (66 dppscm). In other embodiments, the honeycomb extrusion die 420 may comprise a DPD of 290 dppsi (43 (dppscm) to 425 dppsi (64 dppscm). In other embodiments, the honeycomb extrusion die 420 may comprise a die pin density (DPD) of 350 die pins per square inch (dppsi) (54 die pins per square centimeter (dppscm)) to 450 dppsi (70 dppscm). In other embodiments, the honeycomb extrusion die 420 may comprise DPD of 250 dppsi (39 dppscm) to less than 350 dppsi (54 dppscm). This corresponds to honeycomb bodies 100 ranging from 350 cpsi to 450 cpsi, and 250 cpsi to less than 350 cpsi, respectfully.

The foregoing description discloses only example embodiments of the disclosure. Modifications of the above disclosed honeycomb bodies, honeycomb structures, extrusion dies, and methods which fall within the scope of the disclosure will be readily apparent to those of ordinary skill in the art. Accordingly, while the present disclosure has been described in connection with example embodiments thereof, it should be understood that other embodiments may fall within the scope of the disclosure, as defined by the claims.

What is claimed is:

1. A honeycomb structure comprising:
   intersecting porous walls extending between an inlet end and an outlet end of the honeycomb structure;
   inlet channels and outlet channels formed by the intersecting porous walls, the inlet channels comprising inlet hydraulic diameters HDi and the outlet channels comprising outlet hydraulic diameters HDo, the inlet channels comprising inlet corners with inlet corner radii Ri, and the outlet channels comprising outlet corners with outlet corner radii Ro;
   a centerpost defined by adjacent opposing inlet corners of two of the inlet channels and adjacent opposing outlet corners of two of the outlet channels; wherein the centerpost comprises:
      a first diagonal length D1 being a shortest distance between the adjacent opposing outlet corners of the two outlet channels;
      a second diagonal length D2 being a shortest distance between the adjacent opposing inlet corners of the two inlet channels;

an aspect ratio D1:D2 being less than 2.7 when a hydraulic diameter ratio HDi:HDo is in a range from 1.4 to 1.6; and the aspect ratio D1:D2 being less than 2.2 and the outlet corner radii Ro being less than 7 mils when the hydraulic diameter ratio HDi:HDo is in a range from 1.2 to less than 1.4.

2. The honeycomb structure of claim 1 wherein the aspect ratio D1:D2 is less than 2.7, the hydraulic diameter ratio HDi:HDo is from 1.4 to 1.6; and Ri:Ro is greater than or equal to 2.5.

3. The honeycomb structure of claim 1 wherein the aspect ratio D1:D2 is in a range from 1.5 to 2.3 and the hydraulic diameter ratio HDi:HDo is in a range from 1.4 to 1.6.

4. The honeycomb structure of claim 1 wherein the aspect ratio D1:D2 is in a range of 1.5 to 2.25 and the hydraulic diameter ratio HDi:HDo is in a range from 1.4 to 1.6.

5. The honeycomb structure of claim 1 wherein the aspect ratio D1:D2 is in a range of 1.5 to 1.9 and the hydraulic diameter ratio HDi:HDo is in a range from 1.2 to less than 1.4.

6. The honeycomb structure of claim 1 wherein a radius ratio Ri:Ro is in a range from 2.0 to 3.5.

7. The honeycomb structure of claim 1 wherein a radius ratio Ri:Ro is in a range from 2.5 to 3.5.

8. The honeycomb structure of claim 1 wherein a channel density is in a range from 275 cpsi to 425 cpsi.

9. The honeycomb structure of claim 1 wherein a channel density is in a range from 290 cpsi to 410 cpsi.

10. The honeycomb structure of claim 1 wherein the porous walls comprise a transverse wall thickness in a range from 2 mils (0.05 mm) to 13 mils (0.33 mm).

11. The honeycomb structure of claim 10 wherein the porous walls comprise a transverse wall thickness in a range from 4 mils (0.10 mm) to 10 mils (0.25 mm).

12. The honeycomb structure of claim 1 comprising:
a channel density in a range from 350 cpsi to 450 cpsi;
the porous walls comprising a wall thickness in a range from 5 mil (0.13 mm) to 10 mil (0.25 mm);
the hydraulic diameter ratio HDi:HDo is a range from 1.4 to 1.6; and
the aspect ratio D1:D2 is in a range from 2.0 to 2.3.

13. The honeycomb structure of claim 1 wherein:
a channel density is in a range from 250 cpsi to less than 350 cpsi;
the porous walls comprising a wall thickness in a range from 7 mils (0.18 mm) to 10 mils (0.25 mm);
the aspect ratio D1:D2 is in a range from 1.6 to 2.0; and the hydraulic diameter ratio HDi:HDo is in a range from 1.2 to 1.4.

14. The honeycomb structure of claim 1 wherein:
a channel density is in a range from 250 cpsi to less than 350 cpsi;
the porous walls comprising a wall thickness in a range from 7 mils (0.18 mm) to 10 mils (0.25 mm);
the aspect ratio D1:D2 is in a range from 1.7 to 1.9; and
the hydraulic diameter ratio HDi:HDo is in a range from 1.2 to 1.4.

15. The honeycomb structure of claim 1 wherein the outlet corner radii Ro are in a range from 4 mils (0.10 mm) to 7 mils (0.18 mm).

16. The honeycomb structure of claim 1, wherein inlet corner radii Ri are in a range from 10 mils (0.25 mm) to 20 mils (0.51 mm).

17. The honeycomb structure of claim 1 wherein the first diagonal length D1 is in a range from 26 mils (0.66 mm) to 32 mils (0.81 mm).

18. The honeycomb structure of claim 1 wherein the second diagonal length D2 is in a range from 12 mils (0.30 mm) to 18 mils (0.46 mm).

19. A honeycomb structure comprising:
intersecting porous walls extending between an inlet end and an outlet end of the honeycomb structure;
inlet channels and outlet channels formed by the intersecting porous walls, inlet hydraulic diameters of the inlet channels being greater than outlet hydraulic diameters of the outlet channels, and the inlet channels comprising inlet corners with inlet corner radii Ri in a range from 10 mils (0.25 mm) to 14 mils (0.36 mm), and the outlet channels comprising outlet corners with outlet corner radii Ro in a range from 5 mils (0.13 mm) to 7 mils (0.18 mm);
a centerpost defined by adjacent opposing inlet corners of two of the inlet channels and adjacent opposing outlet corners of two of the outlet channels;
a first diagonal length D1 being a shortest distance between the opposing outlet corners of the two outlet channels, D1 being in a range from 25 mils (0.64 mm) to 31 mils (0.79 mm);
a second diagonal length D2 being a shortest distance between the opposing inlet corners of the two inlet channels, D2 being in a range from 12 mils (0.30 mm) to 18 mils (0.46 mm);
an aspect ratio of D1:D2 of the centerpost in a range from 1.6 to 2.0; and
a channel density in a range from 250 cpsi to less than 350 cpsi.

20. A honeycomb structure comprising:
intersecting porous walls extending between an inlet end and an outlet end of the honeycomb structure;
inlet channels and outlet channels formed by the intersecting porous walls, inlet hydraulic diameters of the inlet channels being greater than outlet hydraulic diameters of the outlet channels, and the inlet channels comprising inlet corners with inlet corner radii Ri in a range from 16 mils (0.41 mm) to 20 mils (0.51 mm) and the outlet channels comprising outlet corners with outlet corner radii Ro in a range from 4 mils (0.10 mm) to 7 mils (0.18 mm);
a centerpost defined by adjacent opposing inlet corners of two of the inlet channels and adjacent opposing outlet corners of two of the outlet channels;
a first diagonal length D1 being a shortest distance between the opposing outlet corners of two of the outlet channels, D1 being in a range from 26 mils (0.66 mm) to 32 mils (0.81 mm);
a second diagonal length D2 being a shortest distance between the opposing inlet corners of two of the inlet channels, D2 being in a range from 10 mils (0.25 mm) to 16 mils (0.41 mm);
an aspect ratio D1:D2 of the centerpost in a range from 1.9 to 2.5; and
a channel density in a range from 350 cpsi to 450 cpsi.

21. A honeycomb body comprising:
a honeycomb structure comprising:
intersecting porous walls extending between an inlet end and an outlet end of the honeycomb structure;
inlet channels and outlet channels formed by the intersecting porous walls, the inlet channels comprising inlet hydraulic diameters HDi and the outlet channels comprising outlet hydraulic diameters HDo, the inlet channels comprising inlet corners with inlet corner radii Ri, and the outlet channels comprising outlet corners with outlet corner radii Ro;

a centerpost defined by adjacent opposing inlet corners of two of the inlet channels and adjacent opposing outlet corners of two of the outlet channels; wherein the centerpost comprises:
  a first diagonal length D1 being a shortest distance between the adjacent opposing outlet corners;
  a second diagonal length D2 being a shortest distance between the adjacent opposing inlet corners;
  an aspect ratio D1:D2 being less than 2.7 when a hydraulic diameter ratio HDi:HDo is in a range from 1.4 to 1.6, and a channel density is in a range from 350 cpsi to 450 cpsi; and
  the aspect ratio D1:D2 being less than 2.0 and the outlet corner radii Ro being less than 7 mils when the hydraulic diameter ratio HDi:HDo is in a range from 1.2 to less than 1.4, and the channel density is in a range from 250 cpsi to less than 350 cpsi.

* * * * *

UNITED STATES PATENT AND TRADEMARK OFFICE
CERTIFICATE OF CORRECTION

PATENT NO. : 11,312,662 B2
APPLICATION NO. : 17/052682
DATED : April 26, 2022
INVENTOR(S) : Thomas William Brew et al.

It is certified that error appears in the above-identified patent and that said Letters Patent is hereby corrected as shown below:

On the Title Page

In item (57), in Column 2, in "Abstract", Line 8, delete "(2200)" and insert -- (220o) --.

In item (57), in Column 2, in "Abstract", Line 11, delete "(2200)" and insert -- (220o) --.

Signed and Sealed this
First Day of August, 2023

Katherine Kelly Vidal
*Director of the United States Patent and Trademark Office*